J. W. COHN & M. WEINER.
PROCESS FOR CUTTING AND FITTING WEARING APPAREL.
APPLICATION FILED MAR. 27, 1914.
1,121,581.
Patented Dec. 15, 1914.
3 SHEETS—SHEET 2.
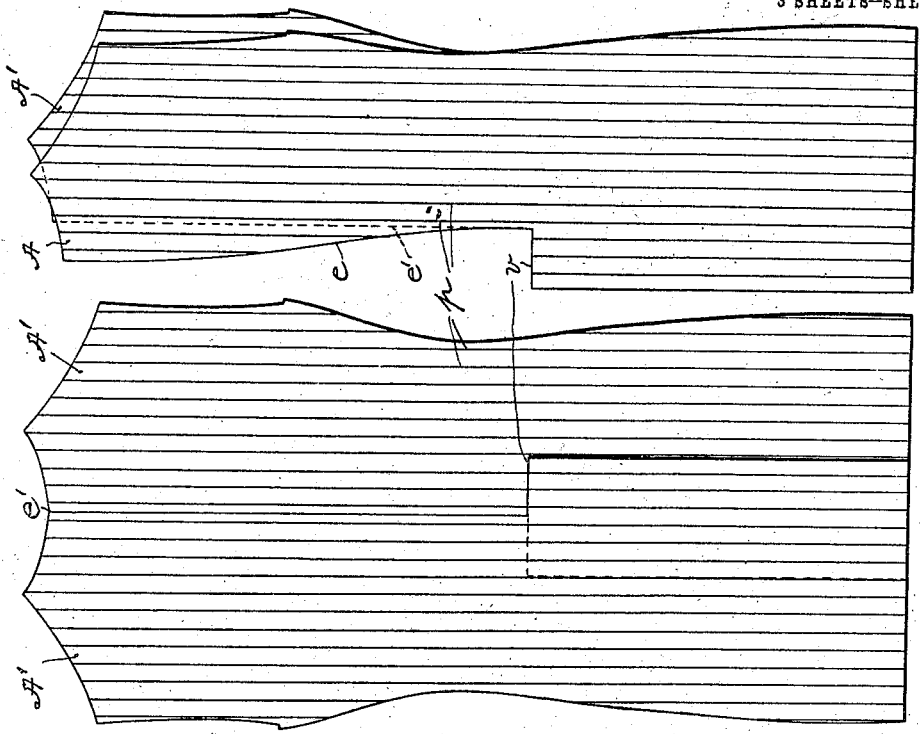
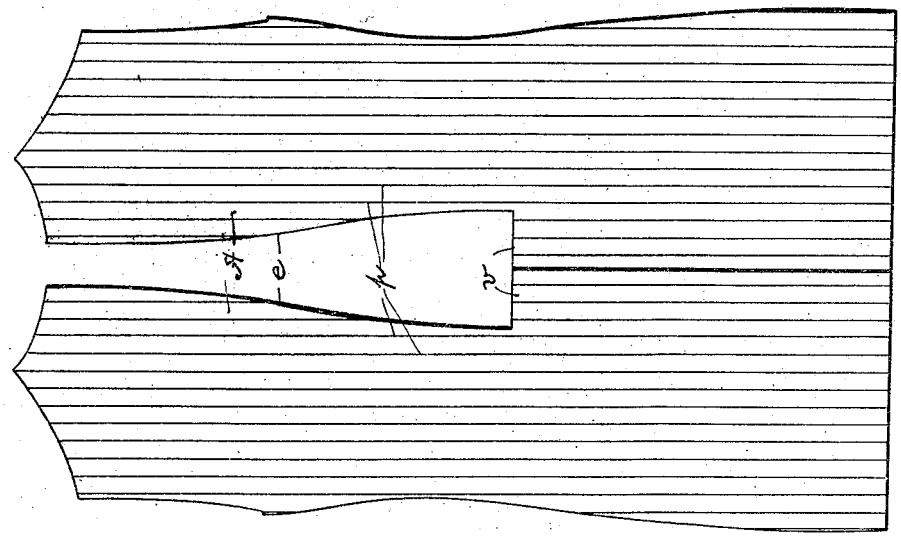

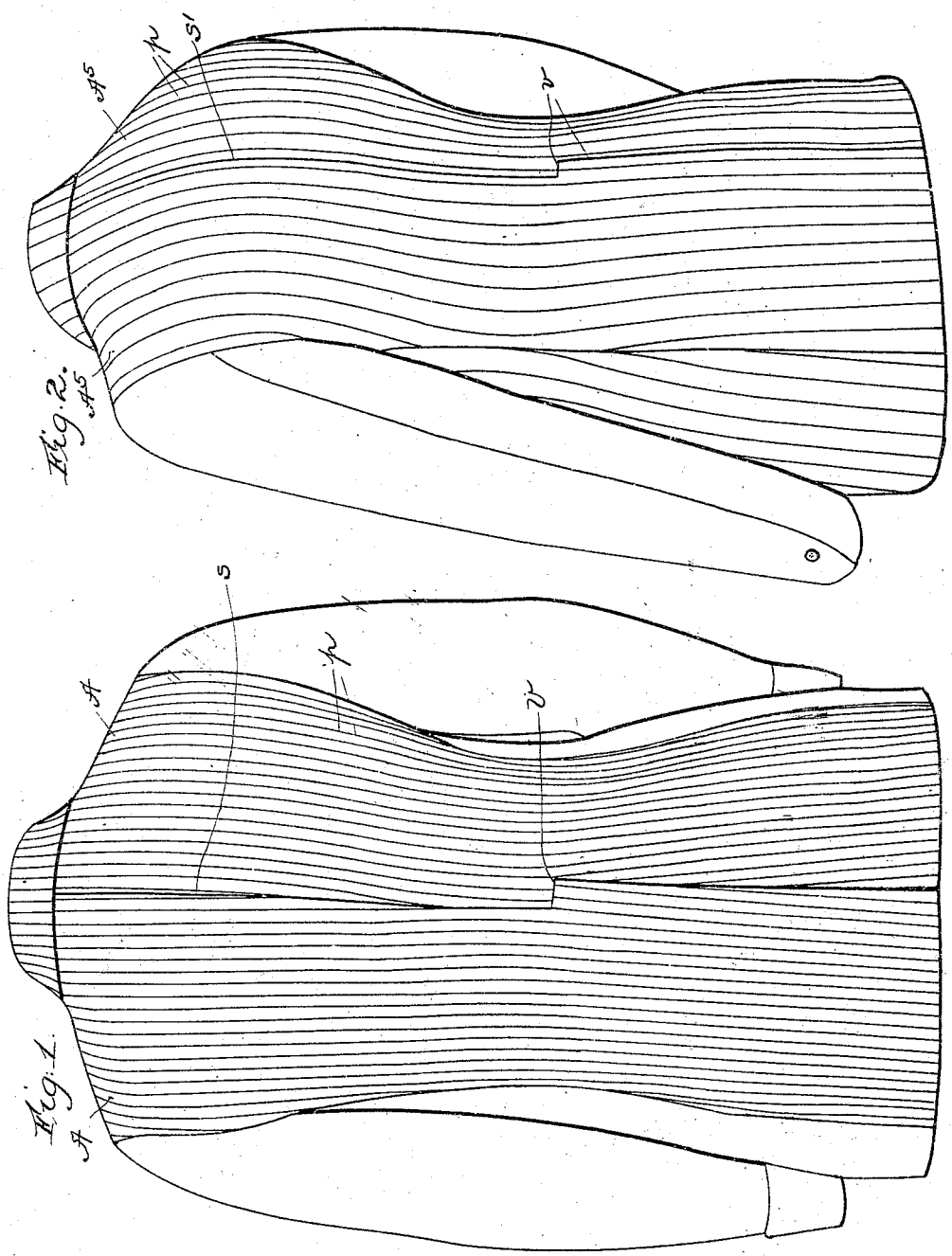

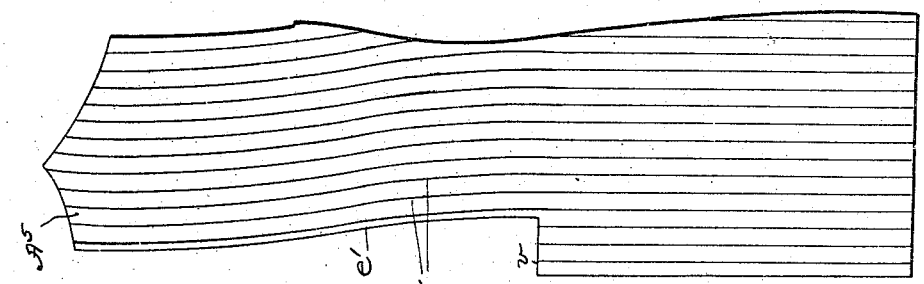
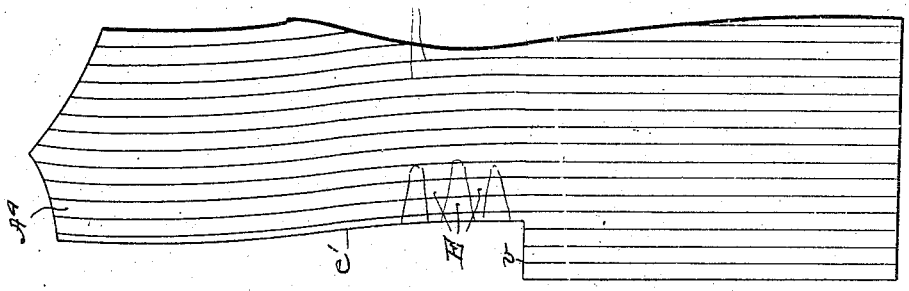
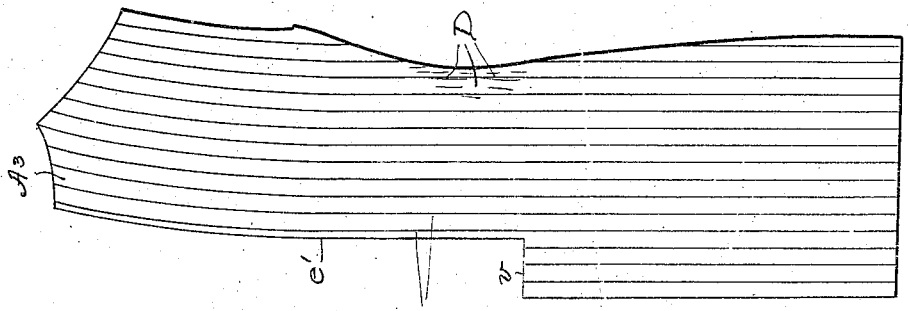
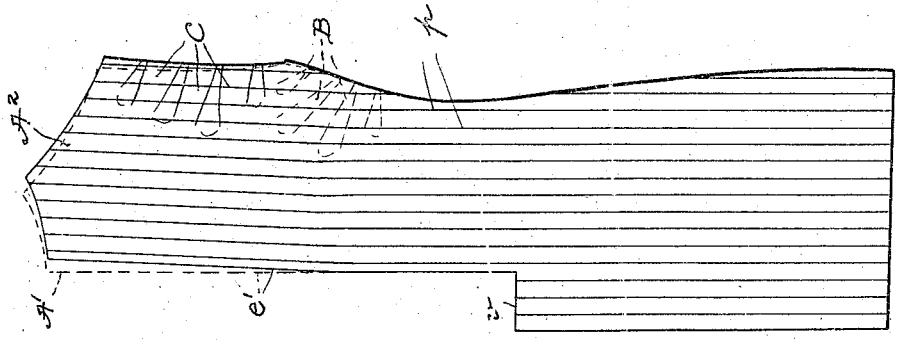

UNITED STATES PATENT OFFICE.

JACOB W. COHN AND MORRIS WEINER, OF CHICAGO, ILLINOIS, ASSIGNORS TO COHN, RISSMAN & COMPANY, OF CHICAGO, ILLINOIS, A CORPORATION OF ILLINOIS.

PROCESS FOR CUTTING AND FITTING WEARING-APPAREL.

1,121,581.      Specification of Letters Patent.      Patented Dec. 15, 1914.

Application filed March 27, 1914. Serial No. 827,686.

*To all whom it may concern:*

Be it known that we, JACOB W. COHN and MORRIS WEINER, citizens of the United States, residing at Chicago, in the county of Cook and State of Illinois, have invented an Improved Process for Cutting and Fitting Wearing-Apparel, of which the following is a specification.

Our invention relates to an improved process for cutting and fitting wearing apparel, and the invention is particularly adaptable for cutting and fitting such garments as coats, waists, cloaks, etc., for men, women and children.

The invention concerns particularly the cutting and fitting of striped or otherwise patterned material. In cutting and fitting a coat, for example, the practice heretofore has been to cut the inner edge of a coat back half along a curved line out of parallelism with the longitudinally running stripes or patterns. With this procedure the stripes or pattern lines will intersect the inner edge or seam line of the halves above the vent, and when the halves are seamed together opposite lines will converge to points in the seam to form darts in the coat back which gives anything but a finished, stylish and smart appearance. Furthermore, the pattern lines or stripes will not intimately follow the curves of the back. We are aware that garments such as coats have been made with the entire back cut from a single piece of cloth so that the stripes or pattern lines would be parallel throughout. This, however, requires skilful and tedious drawing in here and stretching there to work the cloth to fit the back, the results being usually uncertain and unreliable. Furthermore, the pattern lines will not accurately follow the curvature of the back.

The main object of our invention is to provide an improved process for cutting and working two pieces of pattern cloth which are to be seamed together in such manner as to keep the stripes or pattern lines in parallelism with the seam line and to cause them to accurately follow the curves of the body to be fitted, thereby.

The invention is particularly adaptable in the manufacture of backs for coats, waists, cloaks or the like.

Our invention might be said to involve five essential steps.

First, the proper cutting of the cloth for the back halves. In accordance with our process, the inner edge of a back half above the vent is cut straight and parallel with the pattern lines. The next four steps concern the working of these cut halves into shape so that when sewn together along their inner edges they will accurately fit a back and the lines will closely follow the curves of the back.

The second step involves the drawing in or shrinking of a section at the outside of the half below the arm pits, this resulting in throwing outwardly the upper part of the cloth comprising the shoulder and arm-hole section.

The third step involves drawing in or shrinking of the section adjacent the arm-hole to further throw outwardly the upper part of the cloth above the arm-pit line. After the second and third steps the inner edge of the back half will have the proper curvature but the cloth above the vent line will have to be thrown back to give the proper angular position to this edge.

The fourth step therefore involves stretching of the area along the outer edge of the cloth piece along the waist-line, this resulting in throwing inwardly of the part above the waist well toward the final position. Such stretching at the outer edge at the waist section and throwing inwardly of the cloth results in wrinkling or puckering of the cloth along the inside edge of the waist, and the fifth step therefore involves what might be called the absorption of these wrinkles or puckers, and if necessary the cloth at this section is further drawn in and shrunk to fully throw the half above the waist to the correct position, the back halves having then the same shape and outline as though actually cut according to pattern from the cloth, the pattern lines, however, being in parallelism with the inner edge of the halves above the vent so that when the halves are sewed together along this edge the pattern lines will be parallel with the seam and with each other and will accurately follow the curves of the body.

The purpose of our invention and the various steps involved in the process can be clearly understood by reference to the accompanying drawings in which—

Figure 1 is a view of a coat showing the appearance when the back is made in accordance with the old method, Fig. 2 is a similar view showing the coat made in accordance with our improved method, Fig. 3 is a plan view of the two halves of a coat back cut from cloth in accordance with the old method, Fig. 4 is a view of the two halves of a coat back cut in accordance with our improved method, Fig. 5 shows an old method half and a new method half superposed, Fig. 6 shows the shape of a back half after being treated in accordance with the second step of the process, Fig. 7 is a similar view showing the cloth of Fig. 6 treated in accordance with the third step of the process, Fig. 8 is a similar view showing the cloth treated in accordance with the fourth step of the process, and Fig. 9 shows the finished back half after the final treatment in accordance with the fifth step of the process.

Referring to Fig. 3, the back halves A are cut in the old manner from striped cloth, the inner edges $e$ of the sections above the vent $v$ being cut along a pattern curve which causes the pattern lines $p$ above the vent to intersect the edges. When these edges are sewed together the opposite lines will converge and meet in the seam $s$ giving the appearance of darts as illustrated in Fig. 1. Where the pattern lines are close together and not pronounced such darts will not detract so very much from the general appearance. However, where the stripes are pronounced in color and separated a greater distance, the darts will give anything but a finished and smart appearance. Furthermore, the curvature of the lines is destroyed and they do not accurately follow the curves of the body.

In Fig. 4 are shown the two halves A' of a back just cut from the same pattern cloth as the backs of Fig. 3. Instead, however, of cutting the inner edges $e'$ above the vent line along curves, these edges remain straight and parallel with the pattern stripes. The halves could be sewn together and then worked and ironed, but it would require excessive drawing in or shrinking in some places and stretching in other places without any assurance of a perfect fit. Each half, however, can be very readily worked separately so that when the halves are then sewn together a perfect fit will result.

Fig. 5 shows a back half cut according to the old process superposed on a half cut in accordance with our improved process. Our process involves such working of the halves that they will be restored to the same shape and contour they would have had if primarily cut according to pattern with their inner edges curved. Graphically, and referring to Fig. 5, our process involves the shifting of the upper part of the half A' inwardly into full registration with the half A and retaining the pattern lines in parallelism with the curved inner edge and with each other.

In Figs. 6 to 9, the various working steps are clearly illustrated. The dotted lines in Fig. 6 show the outlines of a half A' just after being cut from the cloth.

The second step of our process involves the drawing in or shrinking of the section B just below the arm pit, this resulting in swinging outwardly of the cloth above the arm pit line, the resulting half $A^2$ being illustrated by the full lines in Fig. 6.

The third step of our process involves the drawing in or shrinking of the section C adjacent the arm hole, thus further throwing inwardly the cloth above the arm pit line, the resulting half $A^3$ being shown in Fig. 7. After this third step the inner edge $e'$ will have substantially the correct curvature but the entire cloth above the vent line must be swung inwardly to give this curved line the proper angle.

The fourth step involves stretching of the section D adjacent the outer edge above the vent line to swing the part above the vent line inwardly well toward final position, the resulting half $A^4$ being shown in Fig. 8. Such stretching and throwing inwardly of the cloth results in wrinkling at the section E along the inner edge $e'$ above the vent line, and the fifth step of the process involves the absorbing of these wrinkles, and, if necessary, further drawing in or shrinking along this section E to fully throw the half inwardly to its final position to produce the finished half $A^5$ shown in Fig. 9, and this form is the same as it would be if the cloth had been cut primarily according to pattern. During all the steps of the process the pattern lines remain parallel with each other and with the inner edge, and then when the two finished halves are sewed together along their curved inner edges the pattern lines will be parallel with the seam. The cutting of the cloth is, of course, made with such reference to the pattern lines that when the finished halves are sewn together the seam $s'$ will appear midway between two lines, the distance between which is the same as the pattern distance between the lines. The back of the coat therefore has the appearance of having been cut from a single piece, the pattern lines being all equally spaced and parallel and furthermore, these pattern lines will accurately and closely follow the curves of the body, particularly across the shoulders, around the arms, and at the waist, giving a very trim and smart appearance as clearly shown in Fig. 2.

We have referred to five essential steps in the process. It is understood, of course, that in addition to the primary working steps with the iron, the cloth may have to be given ordinary ironing here and there to smooth out small wrinkles and to make it absolutely smooth. We do not, therefore, desire to be limited to the exact forms and procedures herein shown and described.

We claim as follows:

1. The herein described process of cutting and fitting from striped or patterned cloth the two halves of a coat back, which consists in first cutting each half above the vent line along a straight line parallel with the stripes or pattern line; then shrinking the cloth at predetermined sections adjacent the outer edge to curve the upper part of the piece outwardly to the desired seam curvature, then stretching a section adjacent the outer edge to throw the part above the vent line inwardly to get the desired angle of the seam edge with reference to the part below the vent line, and then sewing the curved edges of the halves together.

2. The improved process of cutting and shaping patterned cloth to form the back half of a garment which consists in first cutting a piece with the inner seam edge straight and parallel with the pattern lines and the upper and outer edge in accordance with the neck, shoulders, arm and waist, then drawing in a section of the cloth adjacent the outer edge below the arm pit by shrinking the material to throw the part above the arm pit outwardly to affect curvature of the seam edge, then drawing in the section adjacent the arm hole by shrinking the material to further throw out the part above the arm pit line and to bring the seam edge to the desired curvature, then stretching the section adjacent the outer edge at the waist to throw the part above the section inwardly, then taking in and smoothing out by shrinking the wrinkles caused along the seam edge by such stretching.

In witness whereof, we have hereunto set our hands to the foregoing specification in the presence of two subscribing witnesses.

JACOB W. COHN.
his
M. × WEINER.
mark

Witnesses:
MARTIN M. WEISS,
BENJ. S. MESIROW.

Copies of this patent may be obtained for five cents each, by addressing the "Commissioner of Patents Washington, D. C."